United States Patent

[11] 3,580,418

| [72] | Inventors | Johannes Werkmeister<br>Reichenbach (Fils);<br>Holger Scheler, Faurndau, Germany |
|---|---|---|
| [21] | Appl. No. | 831,349 |
| [22] | Filed | June 9, 1969 |
| [45] | Patented | May 25, 1971 |
| [73] | Assignee | Firma Hermann Traub<br>Reichenbach (Fils), Germany |
| [32] | Priority | June 17, 1968 |
| [33] | | Switzerland |
| [31] | | 8989/68 |

[54] APPARATUS FOR FEEDING ROD STOCK AND THE LIKE
7 Claims, 6 Drawing Figs.

| [52] | U.S. Cl. | 221/275 |
|---|---|---|
| [51] | Int. Cl. | B65g 59/00 |
| [50] | Field of Search | 221/268,<br>275, 272, 273, 274, 251, 253 |

[56] References Cited
UNITED STATES PATENTS
2,948,435  8/1960  Klink..................... 221/275X

*Primary Examiner*—Stanley H. Tollberg
*Attorney*—Werner W. Kleeman

ABSTRACT: An apparatus for feeding rod-shaped workpieces by means of a feed rod along a trough-shaped channel in a guide rail to a machine tool. During the feeding operation the upper side of the channel in the guide rail is closed by a stationary cover rail, and when the channel is empty, the guide rail is lowered from the cover rail by a plurality of levers which are mounted at one lateral side of the rails so that a new workpiece may be inserted from a magazine rack which is mounted at the other lateral side of the rails.

INVENTOR.
BY Jacobi, Davidson & Kleeman

APPARATUS FOR FEEDING ROD STOCK AND THE LIKE

The present invention relates to an apparatus for feeding rod stock or similar workpieces to a machine tool, especially to an automatic lathe, which apparatus generally comprises a guide tube which is divided along a horizontal longitudinal plane so as to form two parts, namely, a lower trough-shaped guide member and an upper covering rail therefor, which are movable relative to each other. For turning machines such as lathes or the like, the longitudinally divided guide tube extends coaxially to the axis of rotation of the machine.

In the use of machine tools, it is often desirable that the same machine tool be capable of working at different times upon rod stock or similar workpieces of different diameters under the same operating conditions. While suitable means are known which permit the respective parts of the machine tool itself to be adjusted relatively easily to the different diameters of the workpieces, for example, by the insertion of different tubes into the spindle bore of the machine, it has been rather difficult and expensive to adjust the means for feeding rod stock or similar workpieces of different diameters to the machine tool so as to extend coaxially to the machining axis, for example, to the axis of the spindly bore of the machine tool. This has been done, for example, by providing a plurality of guide tubes with different inner diameters and by mounting them in revolverlike means so as to permit each of them to be exchanged for another or by providing a single feed channel of a larger inner diameter and by mounting reducing liners or the like in this feed channel in accordance with the diameter of the particular rod stock or the like to be fed. While the revolverlike means for exchanging the guide tubes are very expensive, the operation of mounting the liners or the like in the larger feed channel requires a considerable length of time.

Most of the known means for feeding rod stock and similar workpieces to a machine tool are provided with a long continuous supporting beam which is mounted on posts or the like and on which by means of bearing blocks the guide tube and a magazine are mounted for storing a supply of the rods or similar workpieces which are to be fed to the machine tool. Such a supporting structure has to be very solid and rigid and consequently of a very heavy weight in order to be able to support the load of the rod stock and to form a sufficiently accurate supporting surface for the guide tube.

It is an object of the present invention to provide an apparatus for feeding rods or similar workpieces to a machine tool, which apparatus should be of a simple construction and a light weight and have a guide tube of the type as first described above which is longitudinally divided so as to form a lower trough-shaped guide rail and an upper cover rail one of which is movable relative to the other, and the guide rail of which, which has a guide channel for feeding workpieces of a certain diameter, is easily accessible so as to permit it to be easily exchanged for a similar guide rail for feeding workpieces of another diameter.

For attaining this object, the invention provides that one of the parts of the guide tube is stationary and rigidly secured to two or more posts and the other part is movable and connected to the stationary part by at least one intermediate gearing which is adapted to move this movable part relative to the stationary part and to control the operation of a device for supplying only one workpiece at a time into the guide channel when the two parts of the guide tube are separated from each other. Another feature of the invention consists in providing a magazine in the form of a rack for holding a supply of the rods or similar workpieces to be fed to the machine tool, and in mounting this magazine on the mentioned posts but separately from the part of the guide tube which is rigidly secured to these posts. This design of the feeding apparatus according to the invention and its division into separate elements permits these elements to be easily inspected and serviced when necessary and the entire apparatus to be made of a lightweight construction and to be mounted directly on the posts without requiring any additional supports for the supply of rod stock or the like and for the guide tube and its associated elements.

The guide rail containing the guide channel is easily accessible and may therefore be easily exchanged for another when rods or similar workpieces of another diameter are to be fed to the machine tool.

Another feature of the invention consists in providing the mentioned gearing of a very simple and inexpensive design and construction. It comprises at least one lever of a substantially triangular shape which is pivotably mounted on the stationary part of the guide tube and is pivotably connected to the movable part of the guide tube and to an actuating element so that the points of connection of the three elements to this lever are spaced from each other and located within the three corners of the triangle. According to another feature of the invention, the triangular lever is rigidly secured to one end of a shaft which is pivotably mounted on the stationary part of the guide tube and carries on its other end a stop arm which is adapted to engage with one of the rods or the like on the magazine rack adjacent to the guide tube so as to insure that only one rod at a time will be supplied into the guide channel of the guide tube when this channel is empty and the two parts of the guide tube are separated from each other. Because of the simple construction of the mentioned gearing and the associated elements which are connected thereto, the entire apparatus is very reliable in operation and its individual elements may be easily inspected and serviced when necessary. The guide rail may also be easily disconnected from this gearing to permit it to be quickly exchanged for a guide rail for feeding rod stock or the like of another diameter.

The feeding movement of a rod or the like along the channel of the guide rail to the machine tool is effected in a conventional manner by a feed rod which is driven by a belt or chain, This belt or chain also serves for automatically effecting all of the other movements of the movable elements of the apparatus by being connected to the actuating element which, as previously stated, is pivotably connected to the triangular lever of the gearing.

According to a preferred embodiment of the invention, the stationary part of the guide tube is formed by the cover rail which consists of two individual rails of an L-shaped cross section and supports all of the means for driving the feed rod. On one outer side facing the posts this cover rail carries the triangular levers of the gearing for raising and lowering the guide rail into and out of engagement with the cover rail, while on the opposite outer side of the cover rail the stop arms of the rod supply are mounted on the shafts of the levers which extend transversely through the cover rail and are pivotably mounted therein. The cover rail may further serve for connecting the posts to each other so as to solidify them in the longitudinal direction of the feeding apparatus.

These and additional features and advantages of the present invention will become more clearly apparent from the following detailed description thereof which is to be read with reference to the accompanying drawings, in which:

FIG. 5 shows a perspective view of the apparatus, as seen in the general direction of the arrow A in FIG. 1 or of the arrow B in FIG. 2; while FIG. 6 shows a perspective view of a part of the apparatus, as seen in the general direction opposite to the direction of the arrow A in FIG. 1 or of the arrow B in FIG. 2.

Figures 1, 2:
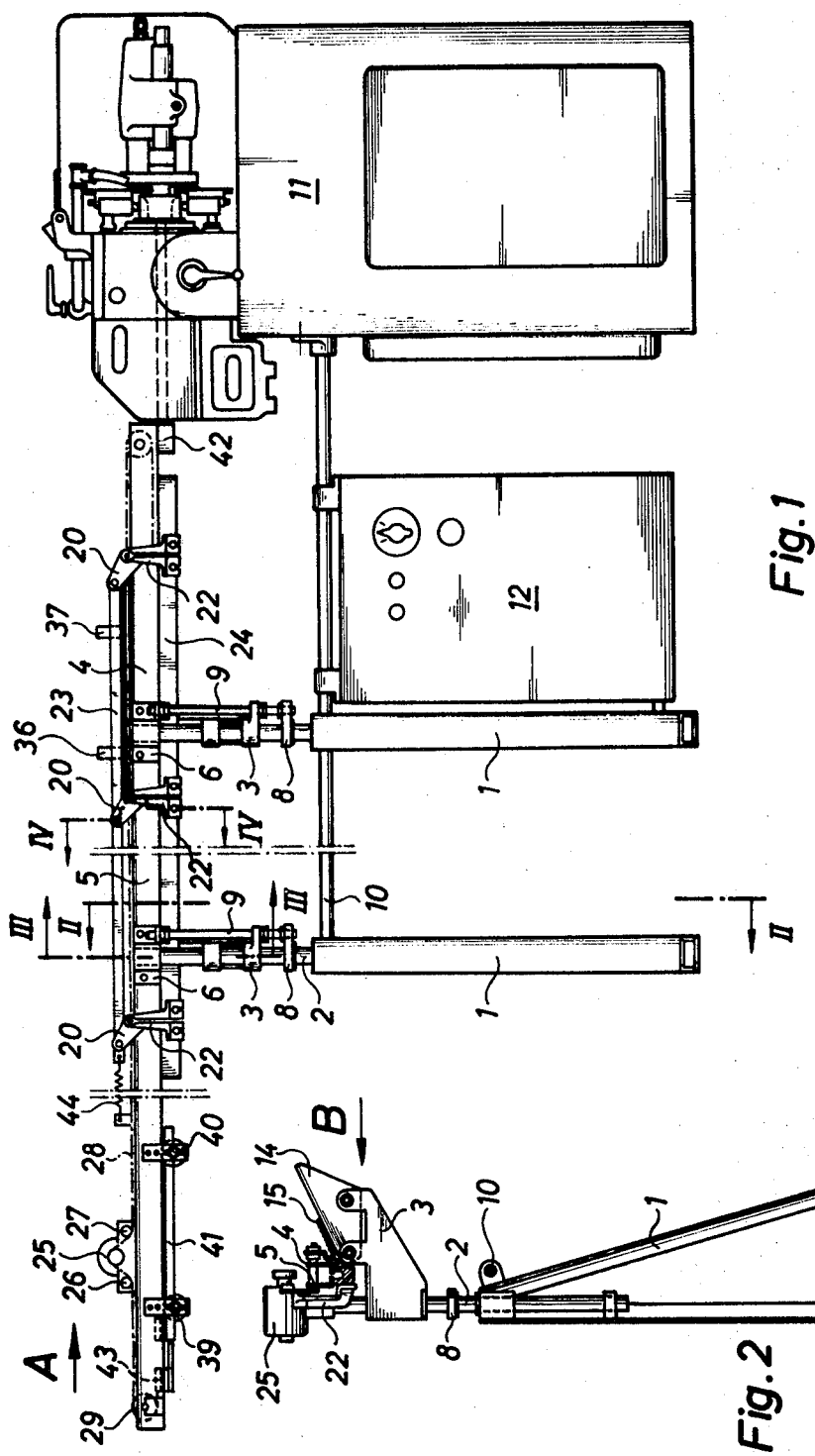
FIG. 1 shows a side view of an apparatus according to the invention.
FIG. 2 shows a cross section which is taken along the line II–II in FIG. 1.

As illustrated in the drawings, the feeding apparatus according to the invention comprises at least two supporting stands 1 of a triangular shape, as shown particularly in FIG. 2. Each of these stands 1 carries a vertical rod-shaped post 2 which, in turn, carries a bracket 3 and a cover rail. This cover rail is composed of two separate rails 4 and 5 of an L-shaped cross section which are connected to, but uniformly spaced from each other by spacing elements 7, while rail 5 is, in turn, connected to each post 2 by a clamping ring or similar device 6.

Each post 2 further carries a supporting ring or similar device 8 which supports the lower end of a supporting rod 9 which serves for vertically adjusting the bracket 3 and separately therefrom the cover rail 4, 5 to different positions, for example, by means of nuts which may be locked on the supporting rods 9 by lock nuts.

The two supporting stands 1 of the apparatus, each of which carries a post 2 and the other parts as previously mentioned, are connected to each other by a connecting bar 10 one end of which is secured to the housing 11 of a single-spindle automatic lathe. Intermediate the housing 11 and the adjacent post 1 a switch cabinet 12 is mounted on the connecting bar 10.

Figure 3:
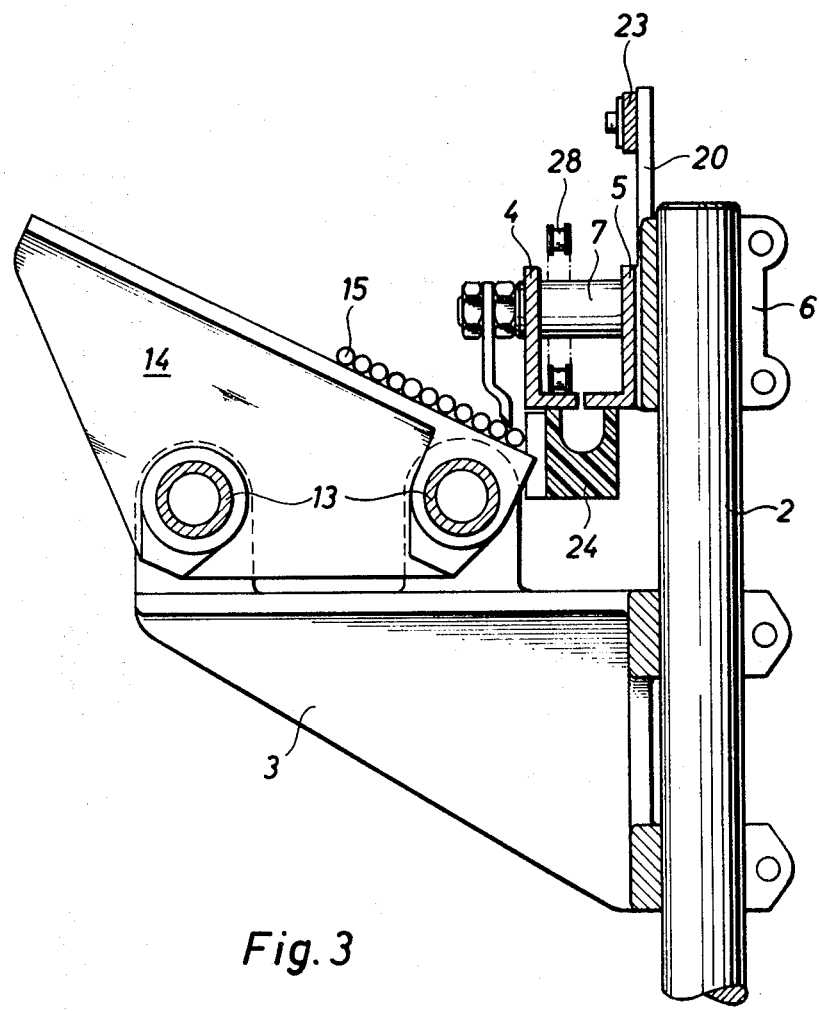
FIG. 3 shows a cross section which is taken along the line III–III in FIG. 1.
Figure 5:
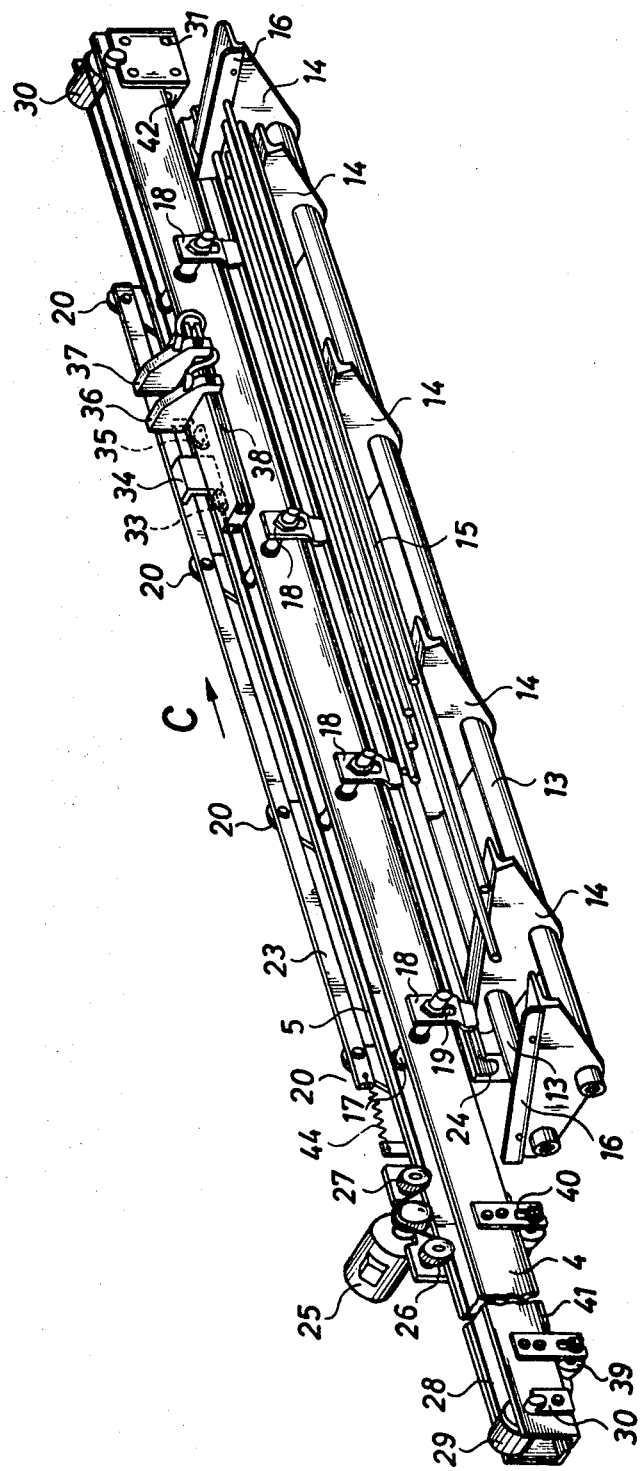

As shown particularly in FIG. 3 and 5, the two brackets 3 are connected to each other by two parallel pipes 13 which carry, for example, four supports 14 which are laterally spaced from each other and have equally inclined upper surfaces and together form a magazine rack for supporting a supply of rods 15 which are to be fed to the machine 11. Each of the two outer supports 14 is provided with a stop bar 16 which projects upwardly from its upper surface.

Figure 4:
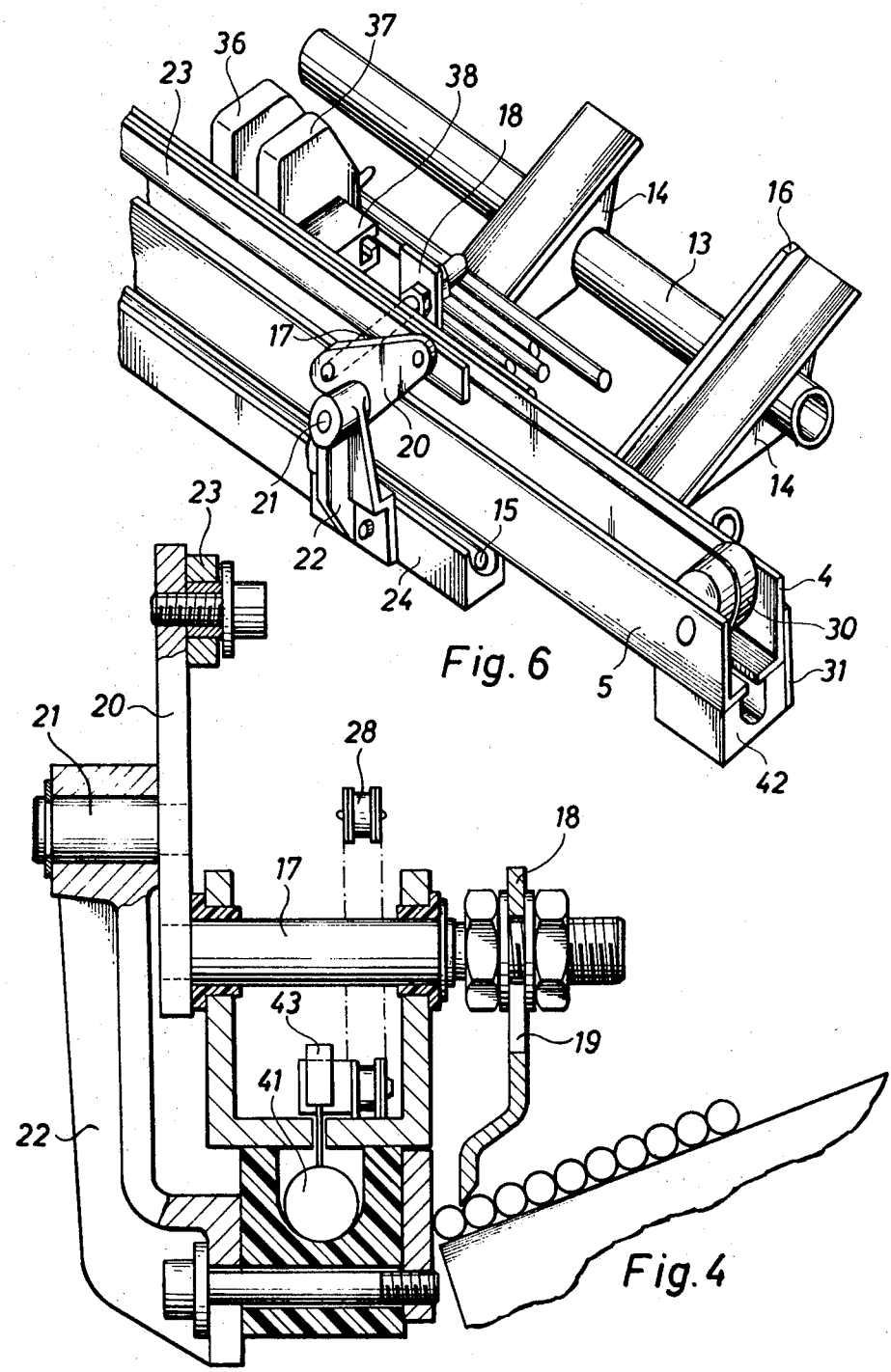
FIG. 4 shows a cross section which is taken along the line IV–IV in FIG. 1.

The upper parts of rails 4 and 5 are provided with bushings in which, for example, four shafts 17 are rotatably mounted which are spaced from each other in accordance with the distances between the adjacent supports 14. On its side facing the associated support 14, each shaft 17 carries a stop arm 18 which, as shown particularly in FIG. 4, is adapted to be rigidly connected to this shaft by a pair of nuts which also permit the stop arm 18 to be adjusted to different positions along the length of the shaft and also to change the effective length of this stop arm which is for this purpose provided with an elongated hole 19. The opposite end of each shaft 17 is rigidly secured to a lever 20 of a substantially triangular shape which may especially be seen in FIG. 6. At a short distance from its point of connection to the shaft 17 but projecting from its opposite side, this lever 20 carries a stud 21 which is pivotably mounted in the upper bearing part of a connecting bracket 22. Near the third corner of the triangular lever 20, that is, at a point thereon which is located on a line extending perpendicular to the line which connects the centers of stud 21 and shaft 17, this lever 20 is pivotably connected to an actuating bar 23 which is similarly connected to all four levers 20. Each of the connecting brackets 22 is secured at its lower end to a trough shaped guide rail 24 which is provided with a continuous guide channel. The points of connection of shaft 17, stud 21, and the actuating bar 23 on the associated lever 20 are located in such positions that, when the lever 20 is pivoted to one end position, guide rail 24 will engage upon the cover rail 4, 5, and when lever 20 is pivoted to the other end position, guide rail 24 will be lowered to such a distance from the cover rail 4, 5 that a rod 15 may pass from one side into the channel in guide rail 24.

Near the rear end of the cover rail 4, 5 remote from the automatic lathe 11, a geared motor 25 is mounted on rail 5. This motor is adapted to drive an endless chain 28 which passes over two guide and tightening wheels 26 and 27 at both sides of the drive gear on the end of the shaft of motor 25 and also over a guide wheel 29 and 30 at each end of the cover rail 4, 5. These guide wheels 29 and 30 are rotatably mounted on two rails 4 and 5 and their shafts are prevented from sliding in their axial directions by locking plates 30 and 31. For moving the actuating bar 23 in the direction of the arrow C in FIG. 5, chain 28 carries a dog 33 which is adapted to abut against a stop member 34 which is mounted on the actuating bar 23. An additional dog 35 on the chain 28 is adapted to actuate two control switches 36 and 37 which are adjustable to different positions along rail 4 by being slidable on a support 38 which is secured to rail 4.

For guiding a feed rod 41 when it is located outside of the guide rail 24, two double-conical rollers 39 and 40 are rotatably mounted near the motor 25 underneath the cover rail 4, 5 and are adjustable to different levels on straps 40 which are secured to the outer sides of the cover rail. As shown particularly in FIG. 6, cover rail 4, 5 further carries on the lower side of its front end adjacent to the automatic lathe 11 a guide member 42 which has a U-shaped cross section and is secured to rail 4 by the locking plate 31.

When the feed rod 41 is retracted from guide rail 24, dog 33 abuts against the associated stop member 34 on the actuating bar 23 and thereby shifts the latter against the action of a return spring 44 in the direction of the arrow C (FIG. 5). This movement of the actuating bar 23 causes guide rail 24 to be lowered to the position as illustrated in FIGS. 5 and 6, in which this guide rail may receive the next rod 15 from the supply of these rods on the support 14 of the magazine rack, while all the other rods 15 on this rack are held in their positions on the supports 14 by the stop arms 18. As soon as the dog 35 actuates the control switch 36, the rotation of motor 25 will be stopped. This also signifies that the guide rail 24 has been lowered so that its guide channel is open, and that the feed rod 41 is located in its rear end position. After a certain time lag which is required for the insertion of the next rod 15 from the supply on the supports 14 into the channel in guide rail 24, control switch 36 again switches on the motor 25, but in a manner so as to rotate in the opposite direction to its previous movement so that chain 28 will now move the feed rod 41 in the forward direction.

At the beginning of this rotation of motor 25, the actuating rod 23 is pulled back by the return spring 44 and thereby causes the guide rail 24 to be lifted into engagement with the cover rail 4, 5. The further rotation of motor 25 then causes the feed rod 41 to be moved in the direction of the arrow C. Feed rod 41 then abuts against the rear end of rod 15 in guide rail 24 and pushes this rod along the guide rail toward and into the automatic lathe 11. This movement of feed rod 41 is effected in the conventional manner by means of a connecting member 43 on the chain 28 which, as shown particularly in FIG. 4, projects through the slot between the rails 4 and 5 into the channel in guide rail 24 and is connected to feed rod 41.

When dog 35 actuates the control switch 31, this signifies that the rod 15 which has last been fed to the machine 11 has been so far consumed by the latter that the last operating cycle of this machine is started. Motor 25 is then switched on so as to return the feed rod 41 to the position as illustrated in FIG. 5. The actuating bar 23 is then again moved in the direction of the arrow C and the stop arms 18 which were previously pivoted upwardly are pivoted downwardly between the rod 15 which is located directly adjacent to guide rail 24 and the following rod 15 on the supports 14, so that, while guide rail 24 is lowered and spaced from the cover rail 4, 5, this following rod 15 will be held back and only the rod which is adjacent to guide rail 24 can roll by its own weight into the latter.

Guide rail 24 is easily accessible and, if rods 15 of a different diameter are to be fed to the machine 11, this guide rail 24 may be easily exchanged for another by unscrewing the bolts which connect it to the connecting brackets 22. If desirable or necessary, guide rail 24 may also be made adjustable relative to the connecting brackets 22.

The feeding apparatus according to the invention is of a simple construction which may be easily inspected and is made of a low weight and at a low cost for its material since the entire guide-tube unit 4, 5, 24 together with the parts which are connected thereto is mounted on the posts 2 independently of the magazine rack 13, 14. Guide rail 24 has a simple shape, it is easily accessible and therefore easily removable from its position underneath the cover rail 4, 5 when it is to be exchanged for another guide rail. Cover rail 4, 5 also serves as a support for the gearing 20, 22 which serves for lifting and lowering the guide rail 24 and for pivoting the stop arms 18. Cover rail 4, 5 further serves for carrying the double-conical rollers 39 which support the feed rod 41 when it is in its retracted position away from the automatic lathe 11.

Although our invention has been illustrated and described with reference to the preferred embodiment thereof, we wish Having thus fully disclosed our invention, what we claim is:

We claim:

1. An apparatus for feeding rod-shaped workpieces to a machine tool for being machined therein comprising at least two uprights, a tubular guide element divided into two parts forming a guide rail having a longitudinal channel and a cover rail adapted substantially to close the upper side of said channel, means for securing a first of said parts in a fixed position to said uprights, driving means, gear means connected to and adapted to be driven by said driving means and movably connecting the second part to said first fixed part for moving said second part vertically relative to said first part from a first position in which said two parts substantially engage with each other and the upper side of said channel is substantially closed by said cover rail to a second position in which said parts are separated by a gap and the upper side of said channel is open, supporting means at one side of said guide element for holding a supply of said workpieces, means for mounting said supporting means in a fixed position independently of said guide element, control means connected to and movable by said gear means when said second part is moved to said second position for allowing only one of said workpieces to pass from said supply on said supporting means through said gap into said channel, and feeding means movable by said driving means for feeding said workpiece along said channel to said machine when said second part has been moved from said second to said first position.

2. An apparatus as defined in claim 1, further comprising an actuating element connecting said driving means to said gear means for moving the latter, said gear means comprising a plurality of parallel shafts pivotably mounted on said first fixed part, a lever being secured at a first point to each of said shafts and being pivotably connected at a second point to said second movable part and at a third point to said actuating element, said three points being spaced from each other so that, if the adjacent points are connected by straight lines, said points form the three corners of a triangle, said control means comprising a stop arm nonrotatably connected to each of said shafts and adapted to be pivoted thereby so that its free end is moved from a point spaced from said workpieces of said supply to a point in engagement with the second workpiece of said supply laterally adjacent to said guide element for stopping all of said workpieces of said supply from moving toward said guide element except the first workpiece when said second movable part is in said second position.

3. An apparatus as defined in claim 2, in which said cover rail forms said first fixed part and said guide rail forms said second movable part which is adapted to be lowered from said first position to said second position when said channel is empty and said first workpiece of said supply is to be passed through said gap into said channel.

4. An apparatus as defined in claim 2, further comprising adjusting means permitting the effective length of each of said stop arms and also its position on said shaft in the longitudinal direction thereof to be varied for adjusting said stop arms to the particular diameter of the workpieces of said supply on said supporting means.

5. An apparatus as defined in claim 3, in which said driving means comprise a motor mounted on said cover rail, an endless flexible driving element adapted to be driven alternately in opposite directions by said motor, guide means for mounting said driving element on said cover rail so as to be movable along the length thereof, said feeding means comprising a feed rod connected to said driving element, and adapted to abut against the rear end of said workpiece in said channel to push said workpiece along said channel toward said machine when said guide rail has been lifted to said first position substantially in engagement with said cover rail and when said driving element is moved by said motor in one direction, associated means on said driving element and on said actuating element, said last means on said driving element being adapted to abut against said associated means on said actuating element when said driving element is moved by said motor in the other direction and then to shift said actuating element so as to pivot said lever about the axis of said shaft to lower said guide rail to said second position in which the next workpiece may be inserted from said supply into said channel after the previous workpiece has been moved by said feed rod so far toward said machine that said channel is empty and the movement of said driving element has thereupon been reversed to retract said feed rod from said channel, spring means for retracting said actuating element so as to pivot back said lever and lift said guide rail to said first position when the movement of said driving is again reversed and said feed rod is again moved forwardly to move said next workpiece along said channel toward said machine, and electric control means for reversing the directions of movement of said motor.

6. An apparatus as defined in claim 5, in which said cover rail is composed of a pair of individual parallel rails each of an L-shaped cross section disposed inversely to each other and rigidly secured to each other, the horizontal webs of said L-shaped rails facing each other being uniformly spaced by a gap from each other, said guide means for said driving element being mounted on said cover rail so that at least the lower strand of said driving element is disposed between said L-shaped rails, said feed rod being disposed underneath said cover rail, and at least one connecting member extending through said gap between said L-shaped rails and connecting said feed rod to said lower strand, said shafts extending transversely through said cover rail, one of said L-shaped rails being secured to said uprights and also carrying said levers on its outer side on one end of said shafts, said stop arms being connected to the other ends of said shafts at the outer side of the other L-shaped rail.

7. An apparatus as defined in claim 1, in which said gear means are disposed on one outer lateral side of said guide element, and further comprising bracket means secured to said uprights and carrying said supporting means for said supply of workpieces on the opposite outer lateral side of said guide element.